United States Patent
Kitazawa

(10) Patent No.: US 9,715,884 B2
(45) Date of Patent: Jul. 25, 2017

(54) INFORMATION PROCESSING APPARATUS, INFORMATION PROCESSING METHOD, AND COMPUTER-READABLE STORAGE MEDIUM

(71) Applicant: CANON KABUSHIKI KAISHA, Tokyo (JP)

(72) Inventor: Kyohei Kitazawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 14/525,740

(22) Filed: Oct. 28, 2014

(65) Prior Publication Data

US 2015/0139445 A1    May 21, 2015

(30) Foreign Application Priority Data

Nov. 15, 2013 (JP) ................................. 2013-237355
Aug. 1, 2014 (JP) ................................. 2014-158122

(51) Int. Cl.
*G10L 21/00* (2013.01)
*G10L 21/0272* (2013.01)
(Continued)

(52) U.S. Cl.
CPC ...... *G10L 21/0272* (2013.01); *G10L 21/0208* (2013.01); *G10L 25/84* (2013.01);
(Continued)

(58) Field of Classification Search
CPC ............. G10L 21/0208; G10L 21/0232; G10L 21/0308; G10L 25/18; G10L 21/0272;
(Continued)

(56) References Cited

U.S. PATENT DOCUMENTS 7,415,392 B2    8/2008 Smaragdis
8,015,003 B2 *  9/2011 Wilson ................ G10L 21/0208
                                                     704/226
(Continued)

FOREIGN PATENT DOCUMENTS

JP    2005-258440 A     9/2005
JP    2011-227417 A    11/2011
JP    2012022120    *  2/2012 ............. G10L 21/02

OTHER PUBLICATIONS

Kameoka, et al., "Complex NMF: a New Sparse Representation for Acoustic Signals", Transaction of Acoustic Society of Japan 2008, 2-8-13, Sep. 2008, pp. 657 to 660.
(Continued)

*Primary Examiner* — Vivian Chin
*Assistant Examiner* — Ubachukwu Odunukwe
(74) *Attorney, Agent, or Firm* — Fitzpatrick, Cella, Harper & Scinto

(57) ABSTRACT

An information processing apparatus includes: an acquisition unit adapted to acquire activities corresponding to a plurality of bases from an audio signal; a determination unit adapted to determine whether the plurality of acquired activities have a specific characteristic; and an output unit adapted to output an audio signal obtained by separating, from the audio signal, a component corresponding to an activity which is determined to have the specific characteristic by the determination unit.

19 Claims, 13 Drawing Sheets

(51) Int. Cl.
G10L 21/0208 (2013.01)
G10L 25/84 (2013.01)
G10L 15/20 (2006.01)
G10L 21/0232 (2013.01)
G10L 21/038 (2013.01)
H04S 7/00 (2006.01)
G10L 21/0216 (2013.01)

(52) U.S. Cl.
CPC .......... *G10L 15/20* (2013.01); *G10L 21/0216* (2013.01); *G10L 21/0232* (2013.01); *G10L 21/038* (2013.01); *H04S 7/40* (2013.01)

(58) Field of Classification Search
CPC ............... G10L 21/02; G10L 21/06; G10L 2021/02166; G10L 25/84; G10L 21/0216; G10L 15/20; G10L 15/00; G10L 15/28; G10L 21/00; G10L 2021/02165; G10L 2021/0135; G10L 25/90; G10L 21/013; G10L 13/06; G10L 21/038; H04R 1/40; H04R 3/00; H04R 29/00; H04R 3/005; H04R 5/04; H04S 7/305; H04S 7/00; H04S 5/02; H04S 7/30; H04S 1/002; H04S 7/40; G01H 7/00; G01H 3/00; G01H 17/00; G10K 11/16; G10K 15/00; G01S 3/8083; H03G 3/00; H03G 5/00; G10H 1/20; G10H 2210/066; G10H 3/125; G10H 1/08; G10H 2250/031; H04B 1/665
USPC ...... 381/94.1, 92, 94.2, 94.3, 94.7, 94.9, 56, 381/57, 59, 58, 103, 71.1, 71.11, 71.14; 704/205, 233, 226, 227, 228, 204, 500, 704/E21.002, 212, 207, 200, 201, 203, 704/254, 208, E21.012; 702/190; 382/173; 345/600; 348/118; 370/206; 340/856.3; 73/579; 700/94
See application file for complete search history.

(56) References Cited

U.S. PATENT DOCUMENTS

| | | | |
|---|---|---|---|
| 9,093,056 B2* | 7/2015 | Pardo | H04S 7/40 |
| 2004/0165736 A1* | 8/2004 | Hetherington | G10L 21/0208 381/94.3 |
| 2012/0136655 A1* | 5/2012 | Yamabe | G10L 25/90 704/207 |
| 2013/0035933 A1* | 2/2013 | Hirohata | G10L 15/20 704/206 |
| 2013/0339011 A1* | 12/2013 | Visser | G10L 25/90 704/207 |
| 2014/0122068 A1* | 5/2014 | Hirohata | G10L 15/20 704/233 |
| 2014/0185827 A1 | 7/2014 | Kitazawa | |
| 2015/0262590 A1* | 9/2015 | Joder | G10L 21/0232 704/201 |

OTHER PUBLICATIONS

Lee, et al., "Algorithms for Non-Negative Matrix Factorization", NIPS, 2000, pp. 556 to 562.
Asano, Futoshi, "Array Signal Processing of Sound—Sound Source Localization, Tracking and Separation", Acoustic Technology Series 16, Corona, Feb. 25, 2011, pp. 70 to 105.

* cited by examiner

F I G. 6
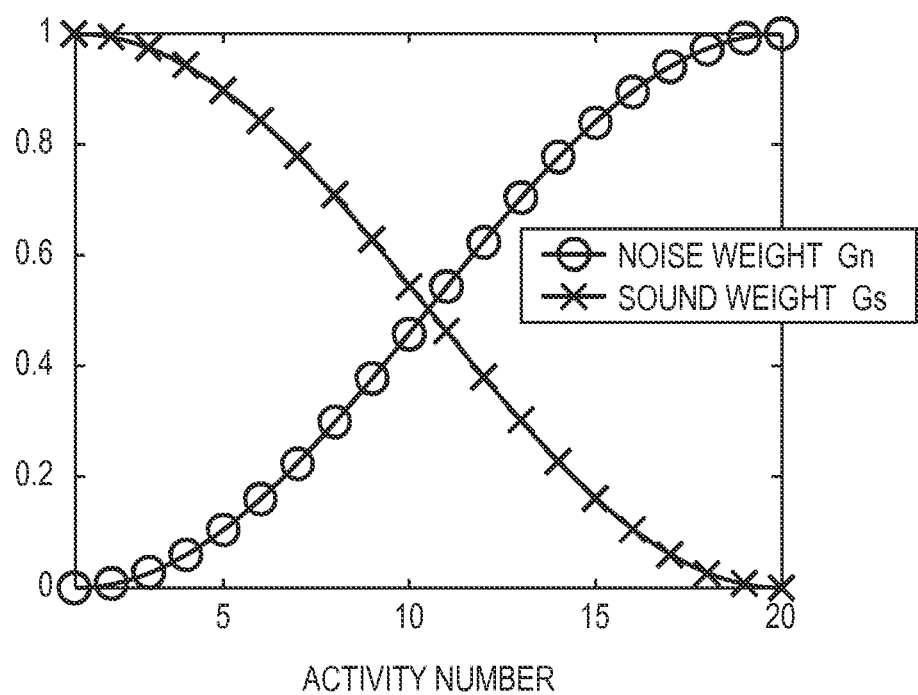

INFORMATION PROCESSING APPARATUS, INFORMATION PROCESSING METHOD, AND COMPUTER-READABLE STORAGE MEDIUM

BACKGROUND OF THE INVENTION

Field of the Invention

The present invention relates to an information processing apparatus, information processing method, and computer-readable storage medium which perform sound source separation and noise prevention.

Description of the Related Art

Digital video cameras and, recently, even digital cameras are capable of capturing moving images, and this increases opportunities for simultaneously recording sounds. Since it is difficult to check a recorded sound during image capturing, it is sometimes found when the sound is played back after image capturing that noise is mixed or a sound of interest is hidden behind another loud sound. Accordingly, techniques of separating a target sound from unnecessary sound components and reducing a noise component have been proposed.

For example, a beamformer is known as a technique of processing a plurality of microphone signals by using directionality information of an sound source, thereby extracting a target sound by emphasizing it, or preventing a non-target sound (see Futoshi Asano, "Array Signal Processing of Sound-Sound Source Locallization•Tracking and Separation-", Acoustic Technology Series 16, CORONA, 2011, Feb. 25, pp. 70-105). Also, as a method of reducing wind noise mixed during image capturing, an arrangement which performs non-negative matrix factorization on a plurality of acoustic signals recorded parallel has been proposed (see Japanese Patent Laid-Open No. 2011-227417). In this arrangement, of a plurality of bases of a basis matrix of a first acoustic signal, a basis having a high correlation with a basis of a basis matrix of a second acoustic signal is specified as a noise basis corresponding to a noise component of the first acoustic signal, and the noise component of the first acoustic signal is suppressed based on this noise basis.

The above-mentioned conventional arrangement performs signal processing by inputting audio signals of a plurality of channels. However, some recording apparatuses such as digital cameras have only one microphone. The above-mentioned arrangement using a plurality of microphone signals cannot be applied to sounds recorded by a recording apparatus like this. This makes it impossible to separate unnecessary sounds or reduce unsteady noise such as wind noise.

SUMMARY OF THE INVENTION

The present invention has been made to solve the above-described problem, and provides a technique capable of separating unnecessary sounds from an audio signal of a single channel, and reducing noise of the signal.

According to one aspect of the present invention, an information processing apparatus includes: an acquisition unit adapted to acquire activities corresponding to a plurality of bases from an audio signal; a determination unit adapted to determine whether the plurality of acquired activities have a specific characteristic; and an output unit adapted to output an audio signal obtained by separating, from the audio signal, a component corresponding to an activity which is determined to have the specific characteristic by the determination unit.

According to another aspect of the present invention, an information processing method to be executed by each unit of an information processing apparatus, includes: an acquisition step of causing an acquisition unit to acquire activities corresponding to a plurality of bases from an audio signal; a determination step of causing a determination unit to determine whether the plurality of acquired activities have a specific characteristic; and an output step of causing an output unit to output an audio signal obtained by separating, from the audio signal, a component corresponding to an activity which is determined to have the specific characteristic in the determination step.

Further features of the present invention will become apparent from the following description of exemplary embodiments (with reference to the attached drawings).

BRIEF DESCRIPTION OF THE DRAWINGS

FIG. 6 is a view for explaining weighting factors in subspectrogram generation;

DESCRIPTION OF THE EMBODIMENTS

Embodiments of the present invention will be explained in detail below with reference to the accompanying drawings.

(Arrangement of Sound Source Separator)

Figure 1:
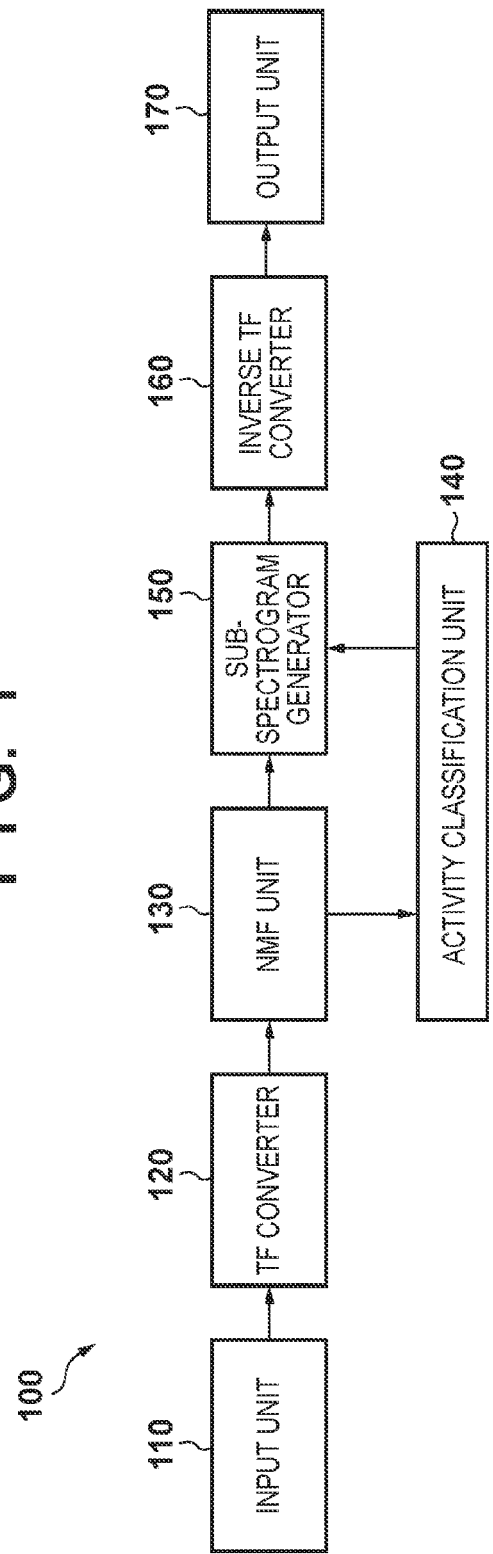
FIG. 1 is a block diagram showing the arrangement of a sound source separator.

FIG. 1 is a block diagram showing the arrangement of a sound source separator according to an embodiment of the present invention. A sound source separator 100 of this embodiment includes an input unit 110, TF converter 120, NMF unit 130, activity classification unit 140, subspectrogram generator 150, inverse TF converter 160, and output unit 170. The sound source separator 100 can be implemented by, for example, an information processing apparatus including a CPU (Central Processing Unit), such as a computer, digital camera, recording apparatus, voice recorder, or embedded system. Each functional block shown in FIG. 1 is implemented by a CPU (not shown) of the sound source separator 100 by cooperating with other constituent elements such as a memory and signal processor based on a computer program.

Input Unit 110

The input unit 110 loads data recording a signal in which an audio signal and noise signal are mixed, and outputs the data to the TF converter 120. In the following description, a signal in which an audio signal and noise signal are mixed will be called a "mixed signal". This mixed signal is given as information representing the relationship between the signal intensity, that is, the amplitude, and the elapsed time.

TF Converter 120

The TF converter 120 converts a waveform signal of the mixed signal input from the input unit 110 into a time-frequency representation (this conversion is called "time-frequency conversion"), and outputs this time-frequency representation to the NMF unit 130. The time-frequency representation herein mentioned is information representing a signal by the relationship between the frequency and elapsed time. For example, a spectrogram is one time-frequency representation. The spectrogram is data obtained by cutting an input temporal waveform signal by applying a window function while shifting a time zone for every predetermined time length, converting the frequencies of the cut signals by FFT or the like, and arranging the obtained frequency spectra in time series. FFT herein mentioned is an abbreviation for Fast Fourier Transform.

The NMF unit 130 performs a process of decomposing the output signal from the TF converter 120 into a component containing a non-negative value basis matrix and a component containing a non-negative value activity matrix. As a process like this, non-negative matrix factorization (to be referred to as "NMF" hereinafter) can be performed on the amplitude component of the spectrogram output from the TF converter 120. NMF is a method of approximating a non-negative value matrix (in this example, the amplitude component of the spectrogram) to the product of the non-negative value basis matrix and non-negative value activity matrix. See, for example, non-patent literature 2 for details of the procedure of NMF. In the following explanation, both the basis matrix and activity matrix are non-negative value matrices.

[Non-Patent Literature 2] Daniel D. Lee, "Algorithms for Non-negative Matrix Factorization", In NIPS, 2000, pp. 556-562.

Expression (1) indicates an expression for approximating an amplitude component Y of the spectrogram to the product of the basis matrix and activity matrix by NMF.

$$|Y| \approx HU \qquad (1)$$

where Y represents the spectrogram, H represents the basis matrix, and U represents the activity matrix. When Y is a matrix of M*N (M rows, N columns), H is a matrix of M*K (M rows, K columns; K is called a basic number), and U is a matrix of K*N (K rows, N columns). The basis matrix H includes K basis vectors $h_n$ (basis spectra). Note that n=1, 2, 3, . . . , K, and $h_n$ is an M-dimensional vector representing the frequency spectrum.

$$H = [h_1 \ldots h_k] \qquad (2)$$

The activity matrix includes K activity vectors $u_n$ (weight vectors). Note that n=1, 2, 3, . . . , K, and $u_n$ is an N-dimensional vector representing a change in basis vector $h_n$ with time.

$$U = [u_1 \ldots u_k]^T \qquad (3)$$

where T represents a transposed matrix. Also, the basis vector and activity vector are non-negative value vectors.

NMF Unit 130

The NMF unit 130 calculates the basis matrix H and activity matrix U having the relationship of (math 1) from the spectrogram Y by applying the well-known NMF method. Then, the NMF unit 130 outputs the calculated basis matrix H and activity matrix U and the phase component of the spectrogram of the mixed signal to the activity classification unit 140 and subspectrogram generator 150.

Activity Classification Unit 140

The activity classification unit 140 classifies activity vectors formed by rows of the non-negative value activity matrix output from the NMF unit 130 into at least two groups in accordance with the characteristics. The characteristics of the activities can be classified in accordance with, for example, the frequency characteristics of the activities. When the purpose is noise reduction, for example, the characteristics are classified into a noise group and sound group.

Figure 2:
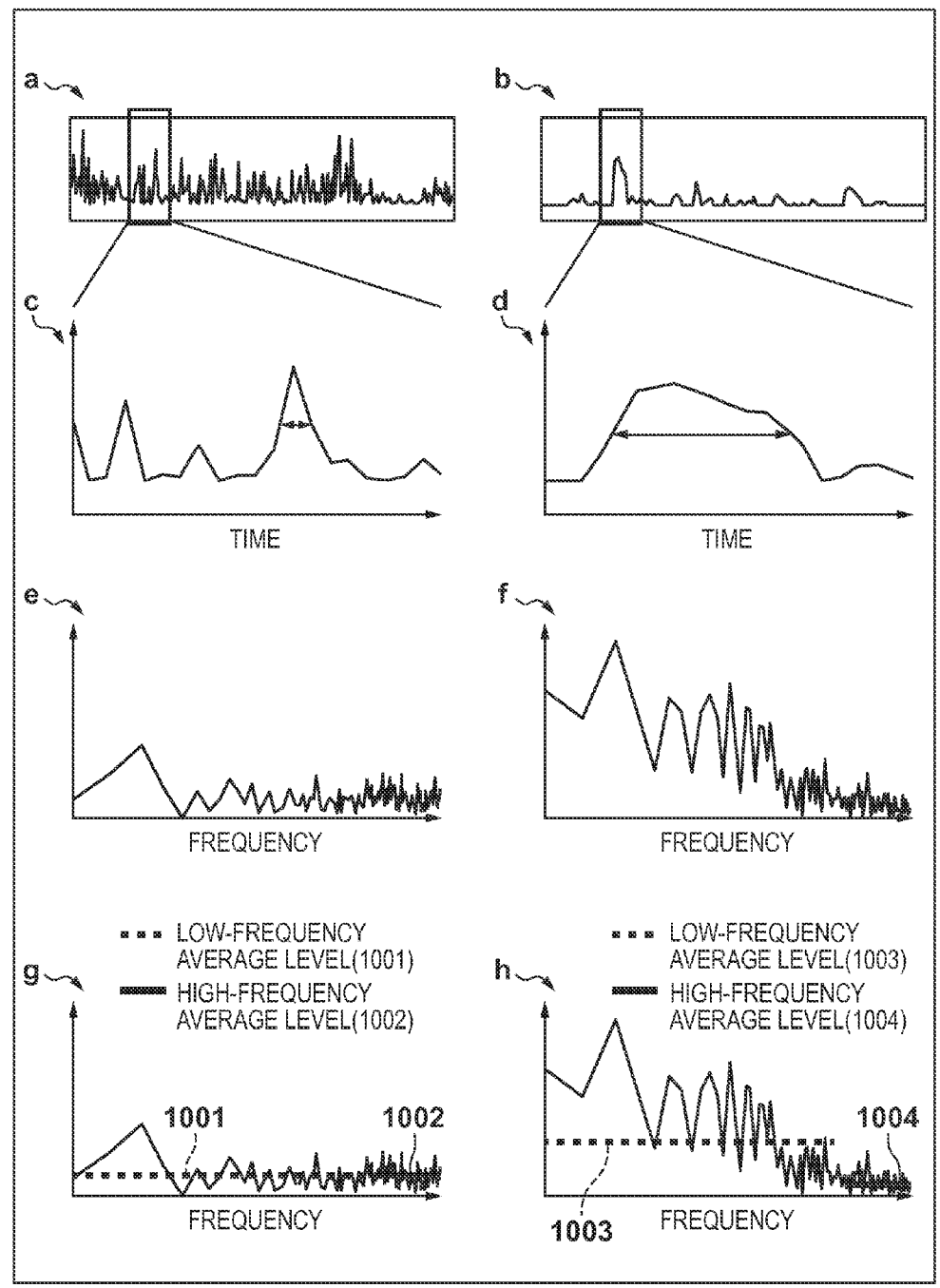
FIG. 2 shows views for explaining activity characteristics.

The activity vector classification method using the frequency characteristic will be explained with reference to FIG. 2. "a" in FIG. 2 represents an example of the activity of noise, and "b" in FIG. 2 represents an example of the activity of an audio signal. "c" in FIG. 2 is an enlarged view of a portion of the noise activity, and "d" in FIG. 2 is an enlarged view of a portion of the audio activity. "e" in FIG. 2 represents the frequency characteristic of the noise activity, and "f" in FIG. 2 represents the frequency characteristic of the audio activity. "g" in FIG. 2 indicates the low-frequency-component average value and high-frequency-component average value of the frequency characteristic of the noise activity shown in "e" of FIG. 2, and "h" in FIG. 2 indicates the low-frequency-component average value and high-frequency-component average value of the frequency characteristic of the audio activity shown in "f" of FIG. 2. More specifically, "g" and "h" in FIG. 2 show a low-frequency-component average level 1001 and high-frequency-component average level 1002 of the frequency characteristic of the noise activity, and a low-frequency-component average value 1003 and high-frequency-component average value 1004 of the frequency characteristic of the audio activity. Note that a reference frequency as the boundary between the low- and high-frequency components of the frequency characteristic is preset in the activity classification unit 140. The low-frequency-component average level 1003 of the frequency characteristic is the average value of frequency characteristics lower than the reference frequency, and the high-frequency-component average level 1004 of the frequency characteristic is the average value of frequency characteristics equal to or higher than the reference frequency. As indicated by "g" and "h" in FIG. 2, the difference between the values of the low- and high-frequency components of the frequency characteristic of the noise activity is generally smaller than that of the frequency characteristic of the audio activity. Therefore, it is also possible to use the difference between the low-frequency-component average value and high-frequency-component average value of the frequency characteristic, and classify an activity vector having a small difference as noise, and an activity vector having a large difference as audio.

Figure 3:
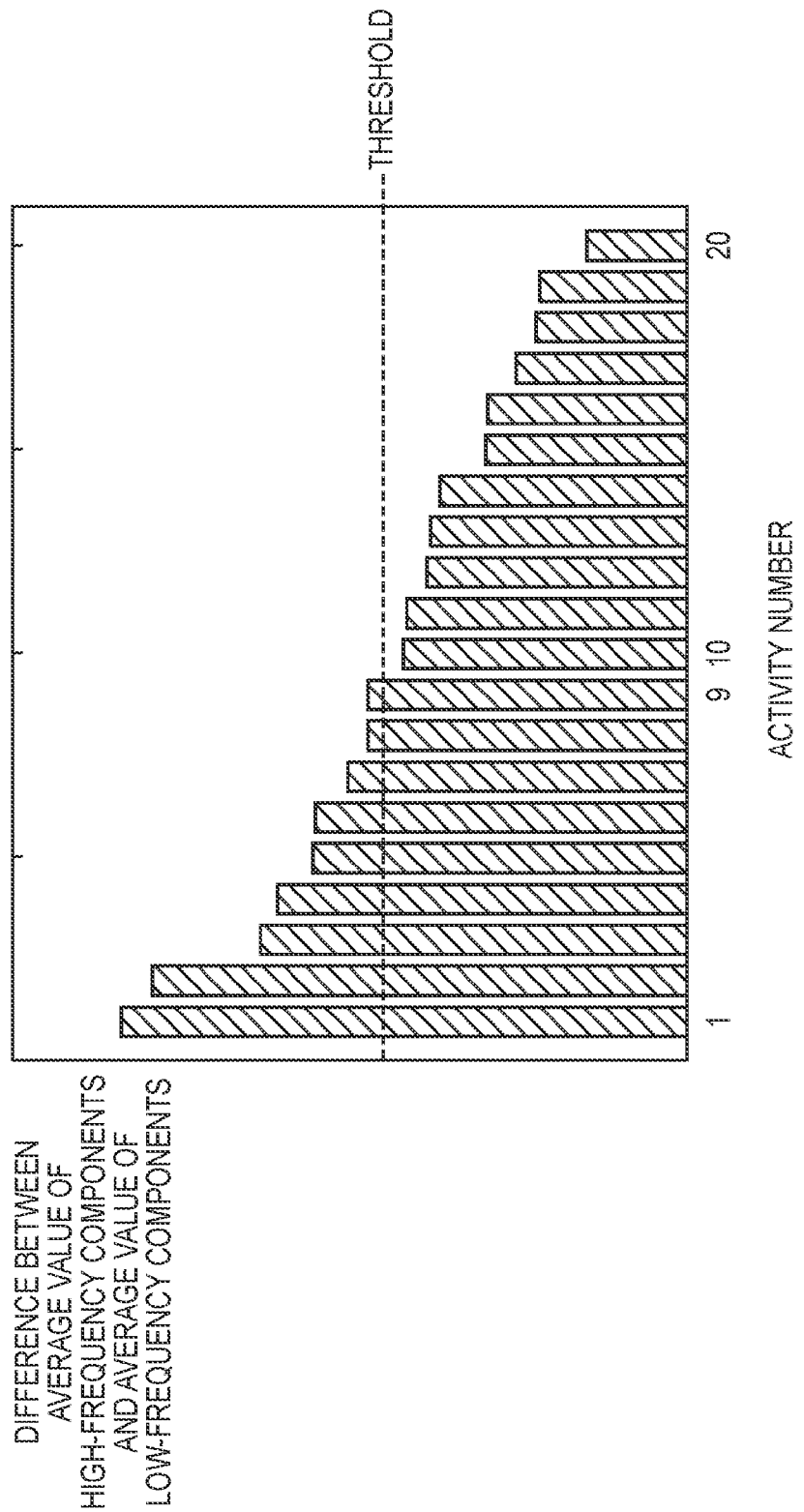
FIG. 3 is a view for explaining activity classification.

A threshold of the difference as a reference when the activity classification unit 140 performs classification into noise and audio will be explained with reference to FIG. 3. FIG. 3 shows results when the difference between the low-frequency-component average value and high-frequency-component average value of the frequency characteristic of the activity of the mixed signal is calculated for each activity vector, and the calculated differences are arranged in descending order. The subspectrogram generator 150 has a preset difference threshold, and classifies the activity in accordance with whether the difference exceeds the threshold. In this example shown in FIG. 3, the first to ninth activities for each of which the difference exceeds the threshold are classified as audio activities, and the 10th to 20th activities are classified as noise components.

Figure 4:
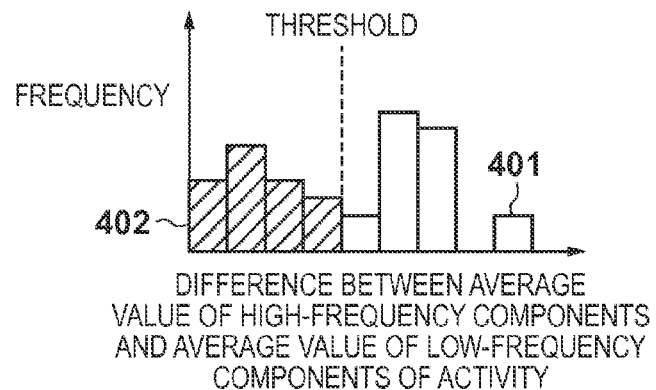
FIG. 4 is a view for explaining the threshold of activity classification.

This threshold can be decided by performing the NMF process on known similar data beforehand, and using the activity characteristics as learning data. A practical example of the threshold deciding method will be explained with reference to FIG. 4. FIG. 4 represents, as a histogram, the difference between the low-frequency-component average value and high-frequency-component average value of the frequency characteristic of the activity vector of each of noise and audio acquired from samples measured in advance. A histogram 401 represents the difference between the low- and high-frequencies of audio, and a histogram 402 represents the difference between the low- and high-frequencies of noise. As the threshold of the classification of the audio and noise activities, it is possible to use, for example, the boundary between histogram distributions.

Subspectrogram Generator 150

The subspectrogram generator 150 generates subspectrograms from the classification results from the activity classification unit 140, the basis vector and activity matrix calculated by the NMF unit 130, and the phase component of the spectrogram of the mixed signal. The subspectrogram herein mentioned is a spectrogram contained in the mixed signal for each sound source. In this embodiment, the noise spectrogram and audio spectrogram are subspectrograms. In sound source separation using NMF, a signal can be separated by classifying the basis or activity for each sound source.

For example, assuming that the activity can be classified into noise and sound, the activity matrix can be described as follows:

$$U=[U_S U_N]^T \quad (4)$$

where $U_S$ represents a matrix containing activity vectors classified into sound, and $U_N$ represents a matrix containing activity vectors classified into noise. Since the basis vectors and activity vectors are in one-to-one correspondence, the basis vectors can also be classified into a matrix $H_S$ containing the basis vectors of sound and a matrix $H_N$ containing the basis vectors of noise as follows:

$$H=[H_S H_N] \quad (5)$$

By using the above results, sound and noise spectrograms can be calculated for each sound source as follows:

$$H_S U_S \approx |Y_S| \quad (6)$$

$$H_N U_N \approx |Y_N| \quad (7)$$

$$HU=H_S U_S + H_N U_N \approx |Y_S|+|Y_N| |Y| \quad (8)$$

where $Y_S$ represents the subspectrogram of sound, and $Y_N$ represents the subspectrogram of noise.

In the example shown in FIG. 3, the first to ninth activities correspond to $U_S$, and the subspectrogram generator 150 generates, based on the threshold, an absolute value $|Y_S|$ of the sound subspectrogram by calculating the product of $U_S$ and the corresponding basis $H_S$. Also, the 10th to 20th activities correspond to $U_N$, and the subspectrogram generator 150 generates an absolute value $|Y_N|$ of the noise subspectrogram by calculating the product of $U_N$ and the corresponding basis $H_N$. The subspectrogram generator 150 outputs the calculated absolute values of the subspectrograms and the phase component of the spectrogram of the mixed signal to the inverse TF converter 160.

Inverse TF Converter 160

The inverse TF converter 160 returns the subspectrogram calculated for each activity classification by the subspectrogram generator 150 to the audio waveform signal by a process inverse to the time-frequency conversion performed by the TF converter 120. For example, it is possible to convert spectra containing the column vectors of the subspectrograms into waveform signals by using IFFT (Inverse-FFT, Inverse Fast Fourier Transform), and superpose and connect the waveform signals while shifting a time zone for every predetermined time length.

Output Unit 170

The output unit 170 outputs a separated audio signal. For example, the output unit 170 includes a loudspeaker, and sequentially plays back separated sounds.

(Sound Source Separation Process)

Figure 5:
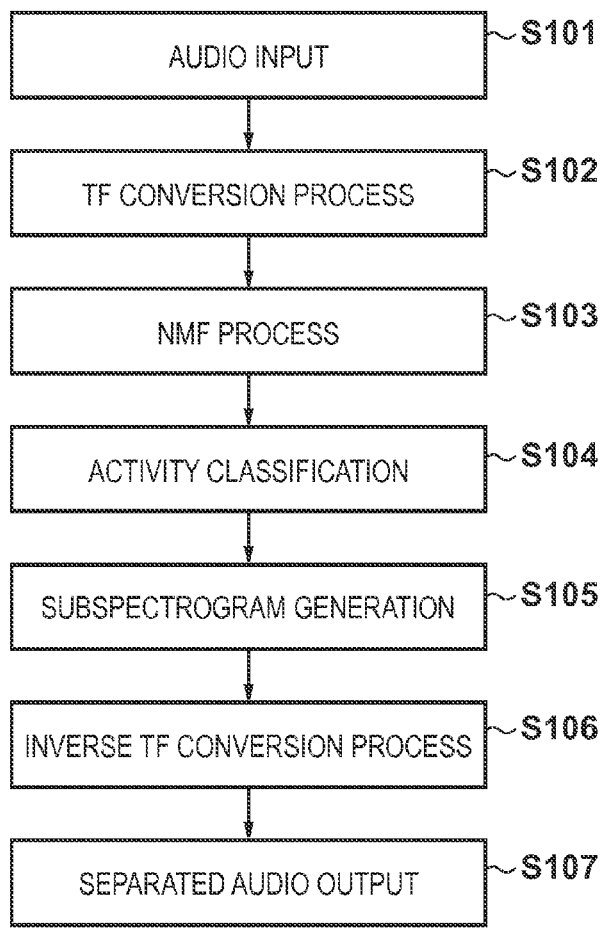
FIG. 5 is a flowchart showing the procedure of a sound source separating process.

Next, the procedure of the signal processing (sound source separation process) executed by the sound source separator 100 will be explained with reference to FIG. 5. The sound source separation process is executed under the control of the CPU of the sound source separator 100.

First, a mixed signal containing a plurality of sounds to be separated is input (step S101). If the input signal is analog, the input unit 110 performs A/D conversion on the input signal and outputs the signal to the TF converter 120.

Then, the TF converter 120 performs the time-frequency conversion process on the mixed signal (step S102). The spectrogram of the mixed signal having undergone the time-frequency conversion is output to the NMF unit 130.

Subsequently, the NMF unit 130 performs the NMF process (step S103). That is, the NMF unit 130 calculates a basis matrix and activity matrix by the NMF process from the amplitude component of the spectrogram of the mixed signal input from the TF converter 120. The NMF unit 130 outputs the calculated activity matrix to the activity classification unit 140, and outputs the basis matrix, the activity matrix, and the phase component of the spectrogram of the mixed signal to the subspectrogram generator 150.

The activity classification unit 140 classifies the activities output from the NMF unit 130 (step S104). In this step, the activity vectors of the input activity matrix are classified in accordance with the frequency characteristics of the activity vectors. The activity vector classification results are output to the subspectrogram generator 150.

The subspectrogram generator 150 generates a subspectrogram as a spectrogram of each sound source classified based on the classification results from the activity classification unit 140 (step S105). For example, when the mixed signal contains sound and noise, a sound spectrogram and noise spectrogram are generated. The generated subspectrograms are output to the inverse TF converter 160.

The inverse TF converter 160 performs the inverse TF conversion process of converting each input subspectrogram into a waveform signal (step S106). A plurality of generated waveform signals are output to the output unit 170.

Finally, the output unit 170 plays back the separated signals (step S107).

In this embodiment as described above, a matrix is acquired by converting an audio signal into a time-frequency representation, and decomposed into at least a non-negative value basis matrix and non-negative value activity matrix. In addition, an activity vector forming each row of the activity matrix is classified in accordance with the characteristic, and the audio signal is separated into a plurality of audio signals in accordance with the classification results. This makes it possible to separate an audio signal recorded by a single channel into a plurality of audio signals in one-to-one correspondence with sound sources. In this embodiment, as a practical example of an arrangement like this, the arrangement capable of classifying activity vectors of a mixed signal, which are calculated by NMF, based on the frequency characteristics of the activity vectors and separating the mixed signal for each sound source even by using a single channel has been explained.

(Modifications)

In this embodiment, an example in which the input unit 110 loads data in which a mixed signal is recorded has been explained. However, it is also possible to perform A/D conversion on a mixed signal obtained by a microphone, and output the converted signal. In this case, a series of processes are performed for every predetermined time length. For example, the time length is so decided that the number of data of a spectrogram in a time-series direction is L (L is an actual number and L>K) in the TF converter 120.

In the above-described example, an input signal to be processed is a mixed signal of an audio signal and noise signal. However, the method of this embodiment is applicable to any signal as long as the signal is a combination of sounds having different activity characteristics. For example, the signal may be a combination of the sound of a musical instrument, noise, a drum, and a melody. In this case, the sound energy of the drum concentrates to the moment the drum is beat, so the peak width of the activity vector is small. The melody holds the musical interval to some extent, so the peak width of the activity vector tends to increase. Accordingly, classification can be performed by using the peak width of the activity vector.

In this embodiment, the TF converter 120 uses a spectrogram in time-frequency conversion. However, it is also possible to use another time-frequency conversion method such as wavelet transform. When using wavelet transform as the time-frequency conversion method, the inverse TF converter 160 performs inverse wavelet transform.

In this embodiment, the NMF unit 130 performs the NMF process on the amplitude component of a spectrogram input from the TF converter 120. However, it is also possible to use a method other than the NMF process, provided that the method outputs a component containing a non-negative value basis matrix and activity matrix. For example, it is possible to use non-negative matrix factor deconvolution (to be referred to as NMFD hereinafter) or complex non-negative matrix factorization (to be referred to as complex NMF hereinafter). NMFD is described in, for example, patent literature 2. See, for example, non-patent literature 3 for complex NMF. When using complex NMF, for example, the process in the subspectrogram generator 150 can be changed as follows. That is, in this embodiment, the subspectrogram generator 150 uses the phase component of the spectrogram of the mixed signal as the phase component of the subspectrogram. In complex NMF, however, the phase component of each subspectrogram is also calculated, so the calculated phase component may also be used.

[Patent Literature 2] Japanese Patent Laid-Open No. 2005-258440

[Non-patent Literature 3] Hirokazu Kameoka et al., "Complex NMF: New Sparse Decomposition Expression and Base System Learning Algorithm", Transactions of Acoustic Society of Japan 2008, 2-8-13, 2008, September, pp. 657-660.

In this embodiment, the activity classification unit 140 uses the difference between the low-frequency-component average level and high-frequency-component average level of the frequency characteristic of the activity as the reference of classification. However, another index may also be used as the classification reference. For example, it is also possible to use the slope of an approximate line obtained when approximating the frequency characteristic of each activity vector to a straight line, and classify the activity vector as noise when the slope is small and as a sound when the slope is large. For example, an activity vector for which the slope of the approximate line is smaller than a predetermined threshold can be classified as a noise activity.

Also, the activity classification unit 140 performs classification by using the frequency characteristic of an activity vector, but classification may also be performed by using another characteristic. For example, classification may also be performed using a temporal characteristic. As can be seen from "a" and "b" in FIG. 2, the peak appearance frequency of the activity of a noise signal is generally higher than that of the activity of an audio signal. Therefore, it is also possible to perform cutting within a predetermined temporal range, for example, for every 20 samples of each activity vector, classify an activity vector having a high peak appearance frequency as noise, and classify an activity vector having a low appearance frequency as a sound. For example, an activity vector having a peak appearance frequency larger than a predetermined threshold can be classified as the activity of noise. Also, "c" and "d" in FIG. 2 each show a partial section of the activity by enlarging the section in the temporal direction. Since the peak width of the activity of noise is smaller than that of the activity of a sound, the average value of peak time spans (half widths) can be used as the reference of classification. For example, it is possible to measure the average value of the peak time spans of each activity vector, and classify an activity vector having an average value smaller than a predetermined threshold as the activity of noise.

Furthermore, the activity classification unit 140 can calculate the sum of the absolute values of derivative values of each activity vector, and use the value of the sum as the reference of classification. When the activity vector is $u_1 = [u_{11}, \ldots, u_{1n}]$, for example, the evaluation value of the activity vector $u_1$ can be calculated by using the following expression (math 9):

$$\sum_{t=1}^{n-dt} \left| \frac{u_{1(t+dt)} - u_{1t}}{dt} \right| \tag{9}$$

Since the activity vector $u_1$ is a discrete value, dt takes a value represented by dt=1, 2, 3, . . . . The activity classification unit 140 may also classify an activity vector for which the above-mentioned evaluation value is larger than a predetermined threshold as noise, and classify an activity vector having an evaluation value smaller than the threshold as a sound.

Figure 11:
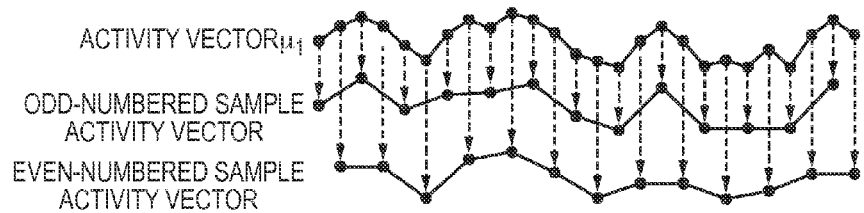
FIG. 11 is a view showing an example in which a plurality of activity vectors are extracted from samples.

The activity classification unit 140 may also have an arrangement which extracts a sample value from an activity vector at an interval of at least one sample. An activity can be classified by comparing at least two vectors obtained by extracting different sample values output at equal intervals from this arrangement. That is, samples are extracted at fixed intervals from an activity vector, thereby acquiring first and second sample vectors. The activity vector is classified by comparing the first and second sample vectors. When the interval is two samples, for example, the extracted sample vectors have the (3n+1)th, (3n+2)th, and (3n+3)th sample values (n=0, 1, 2, 3, . . . ) of the activity vector. At least two of the three vectors are output as sample vectors. That is, the sample vector is a vector obtained by thinning samples forming the activity vector at a predetermined interval. The sample extraction interval changes in accordance with audio data to be classified. When separating noise and sound, for example, the interval must have a value equal to or larger than one sample and smaller than the peak width of the activity. For example, when the interval is one sample, the activity vector is separated into odd-numbered samples and even-numbered samples. In this case, the result of comparison of an odd-numbered sample vector with an even-numbered sample vector may also be used as the reference of classification. As shown in FIG. 11, for example, it is possible to generate an odd-numbered sample activity vector including odd-numbered samples and an even-numbered sample activity vector including even-numbered samples, and classify the activity by using the value of the correlation coefficient (correlation value) of these vectors. For example, it is possible to classify an activity having a correlation coefficient larger than a predetermined threshold as sound, and an activity having a correlation coefficient smaller than the threshold as noise.

Figure 12:
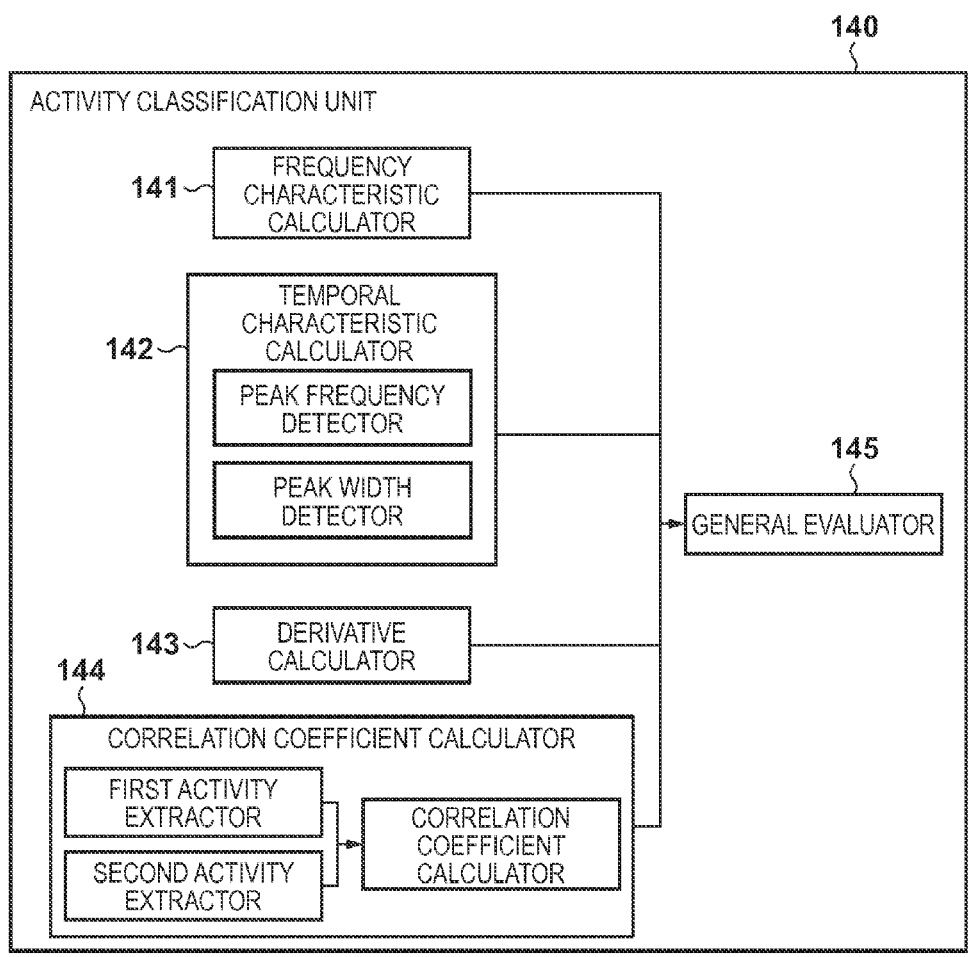
FIG. 12 is a block diagram showing an arrangement example of an activity classification unit.

Furthermore, the activity classification unit 140 may also include all the classification methods described above as shown in FIG. 12. Referring to FIG. 12, the activity classification unit 140 includes a frequency characteristic calculator 141, temporal characteristic calculator 142, derivative calculator 143, correlation coefficient calculator 144, and general evaluator 145. The frequency characteristic calculator 141 calculates the frequency characteristic of an activity vector, and outputs an evaluation value for classification. The temporal characteristic calculator 142 detects the peak frequency or peak width of an activity vector, and outputs an evaluation value for classification. The derivative calculator 143 calculates the derivative value of an activity vector, and outputs an evaluation value for classification. The correlation coefficient calculator 144 calculates the correlation of vectors extracted from an activity vector, and outputs an evaluation value for classification. As shown in FIG. 12, the correlation coefficient calculator 144 includes first and second activity extractors for extracting activity vectors, and a correlation coefficient calculator for calculating the correlation coefficients of the activity vectors extracted by the activity extractors. The general evaluator 145 generally judges the results of classification based on a method of evaluating the temporal characteristic, the frequency characteristic, the derivative characteristic, and the correlation coefficient of the extracted activity, thereby classifying the activity. For example, the generator evaluator 145 can calculate a classification reference by performing predetermined weighting on the evaluation values output from the frequency characteristic calculator 141, temporal characteristic calculator 142, derivative calculator 143, and extracted vector correlation coefficient calculator 144, and perform classification in accordance with the reference.

In this embodiment, the subspectrogram generator 150 separates the activity vector by using the threshold, and forms subspectrograms for the individual sound sources. However, separation may also be performed using weighting factors. That is, for each activity vector, it is also possible to output a first weighting factor indicating the relation to a first activity, and a second weighting factor indicating the relation to a second activity, and separate an audio signal based on the first and second weighting factors. For example, a noise weight Gn and sound weight Gs are set for each activity in the order of activity numbers shown in FIG. 3. Then, the sound weight Gs is increased and the noise weight Gn is decreased for an activity classified as a sound signal for which the difference between the low-frequency-component average value and high-frequency-component average value is large in the frequency characteristic of the activity as shown in FIG. 6. By contrast, the noise weight Gn is increased and the sound weight Gs is decreased for an activity classified as noise for which the difference between the low-frequency-component average value and high-frequency-component average value is small. Consequently, a signal in which a sound component is prevented can be obtained for a noise subspectrogram, and a signal in which noise is prevented can be obtained for a sound subspectrogram. Each of the noise and sound subspectrograms is obtained by calculating the sum of values each obtained by multiplying the product of the basis vector and activity vector by the weighting factor as follows:

$$|Y_N| = \sum_{i=1}^{K} Gn_i * h_i u_i \tag{10}$$

$$|Y_S| = \sum_{i=1}^{K} Gs_i * h_i u_i \tag{11}$$

Figure 7:
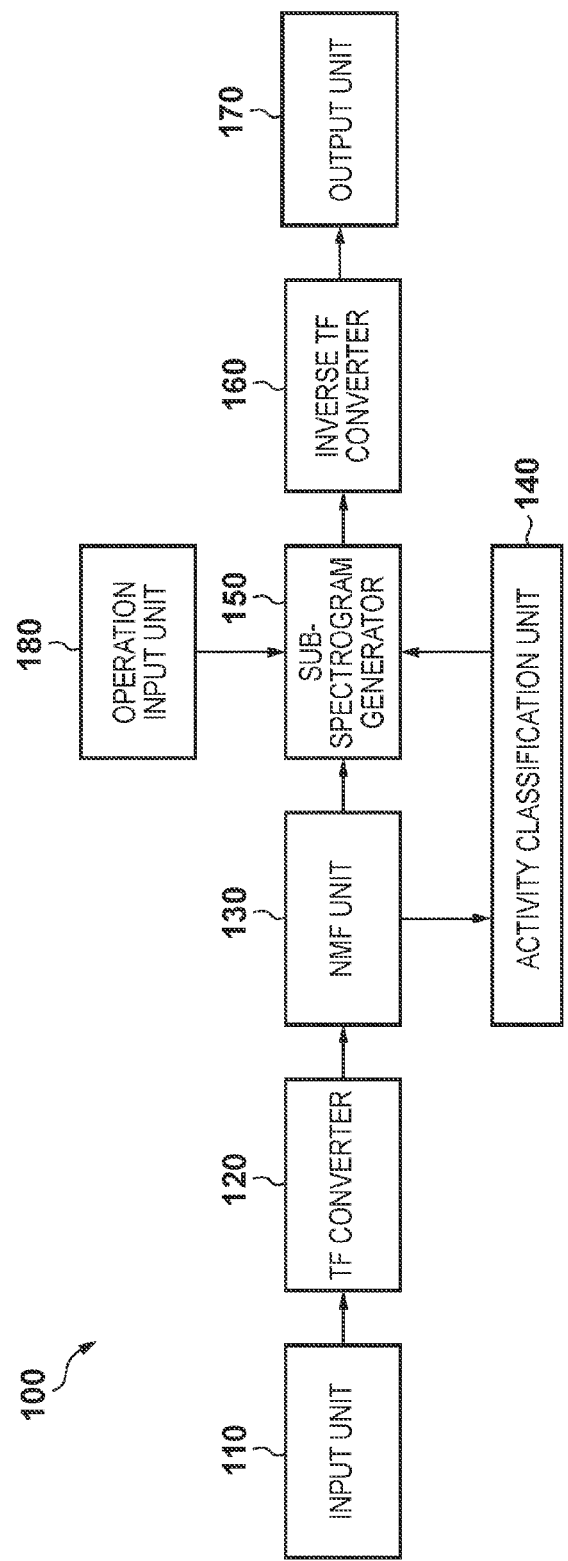
FIG. 7 is a block diagram showing the arrangement of a sound source separator including an operation input unit.

Furthermore, the sound source separator 100 may also include an operation input unit 180 as shown in FIG. 7. The operation input unit 180 is so designed as to be able to switch thresholds or weights of the subspectrogram generator 150 in accordance with a user's designation input. For example, the operation input unit 180 includes a rotary switch, and the number of activities to be classified as sound increases (or decreases) when the rotary switch is rotated by one stage. Although the first to ninth activities are classified as sound in the example of this embodiment, this can be changed such that the first to tenth (or eighth) activities are classified as sound when the rotary switch is rotated by one stage. By thus deciding the reference for classifying activity vectors based on a designation input from the user, it is possible to perform appropriate sound separation and noise reduction in accordance with a user's object or application.

The output unit 170 is a loudspeaker in this embodiment, but may also be, for example, a recorder for recording a separated sound. For example, the output unit 170 may also be configured to record digital audio data.

(Arrangement of Noise Reducer)

Figure 8:
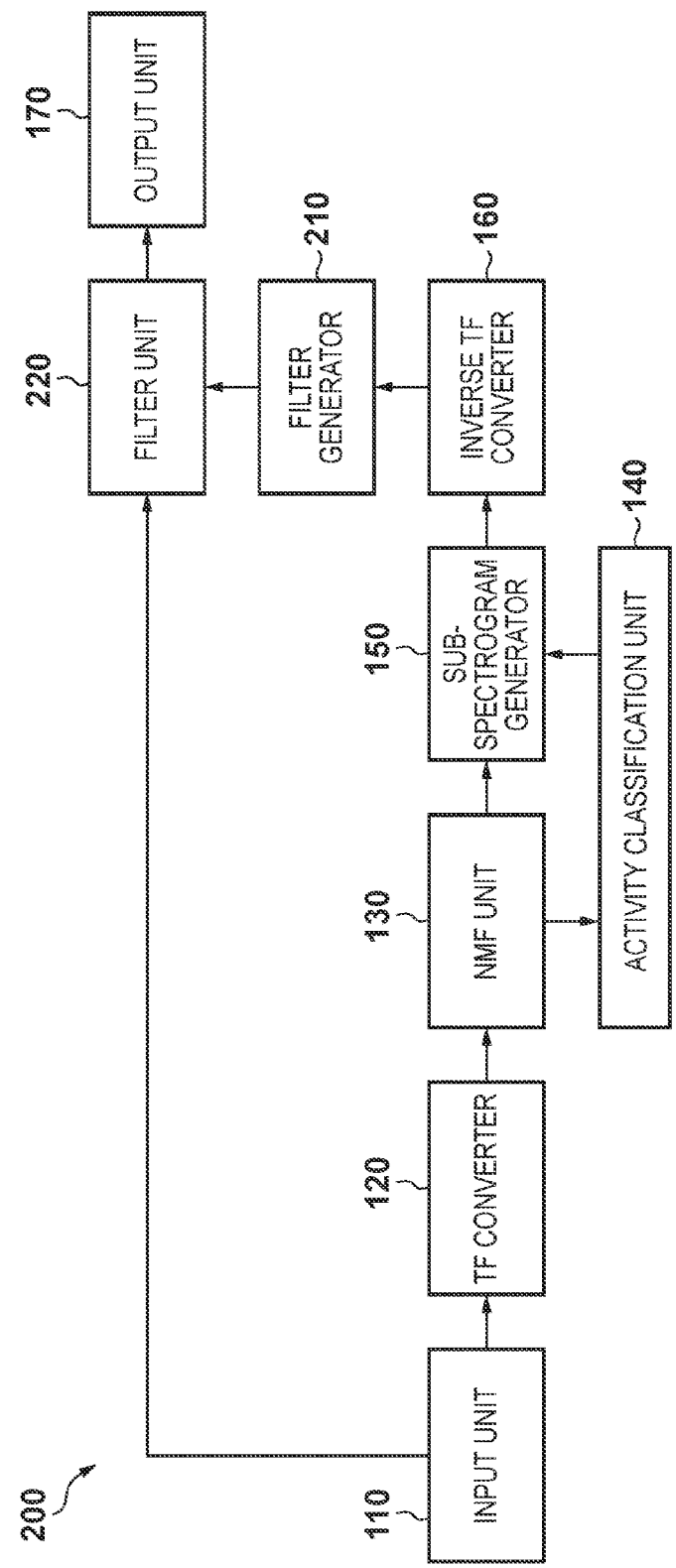
FIG. 8 is a block diagram showing the arrangement of a noise reducer.

FIG. 8 is a block diagram showing the arrangement of a noise reducer according to another embodiment of the present invention. A noise reducer 200 of this embodiment includes an input unit 110, TF converter 120, NMF unit 130, activity classification unit 140, subspectrogram generator 150, inverse TF converter 160, output unit 170, filter generator 210, and filter unit 220. The input unit 110, TF converter 120, NMF unit 130, activity classification unit 140, subspectrogram generator 150, inverse TF converter 160, and output unit 170 have the same arrangements as those of the above-described embodiment, so a detailed explanation thereof will be omitted. Like the sound source separator 100, the noise reducer 200 can be implemented by an information processing apparatus including a CPU, for example, a computer.

The filter generator 210 generates a filter from a plurality of separated signals, and outputs the filter coefficient to the filter unit 220. For example, the filter generator 210 generates a Wiener filter for preventing noise, from a noise signal and target sound signal separated from each other. The filter generator 210 calculates a power spectrum by FFT for each of the input noise signal and target sound signal. Then, the filter generator 210 generates a Wiener filter F for a frequency region by using the power spectra of the noise signal and target sound signal. The Wiener filter F for the frequency region can be represented by:

$$F(f)=\{S(f)\}/\{S(f)+N(f)\} \qquad (12)$$

where f is the frequency, S is the power spectrum of the sound signal, and N is the power spectrum of noise.

The filter unit 220 applies the Wiener filter generated by the filter generator 210 to a signal input to the input unit 110, and outputs the signal to the output unit 170. It is thus possible to reduce noise by suppressing a predetermined audio signal such as a noise signal among a plurality of separated audio signals.

(Noise Reducing Process)

Figure 9:
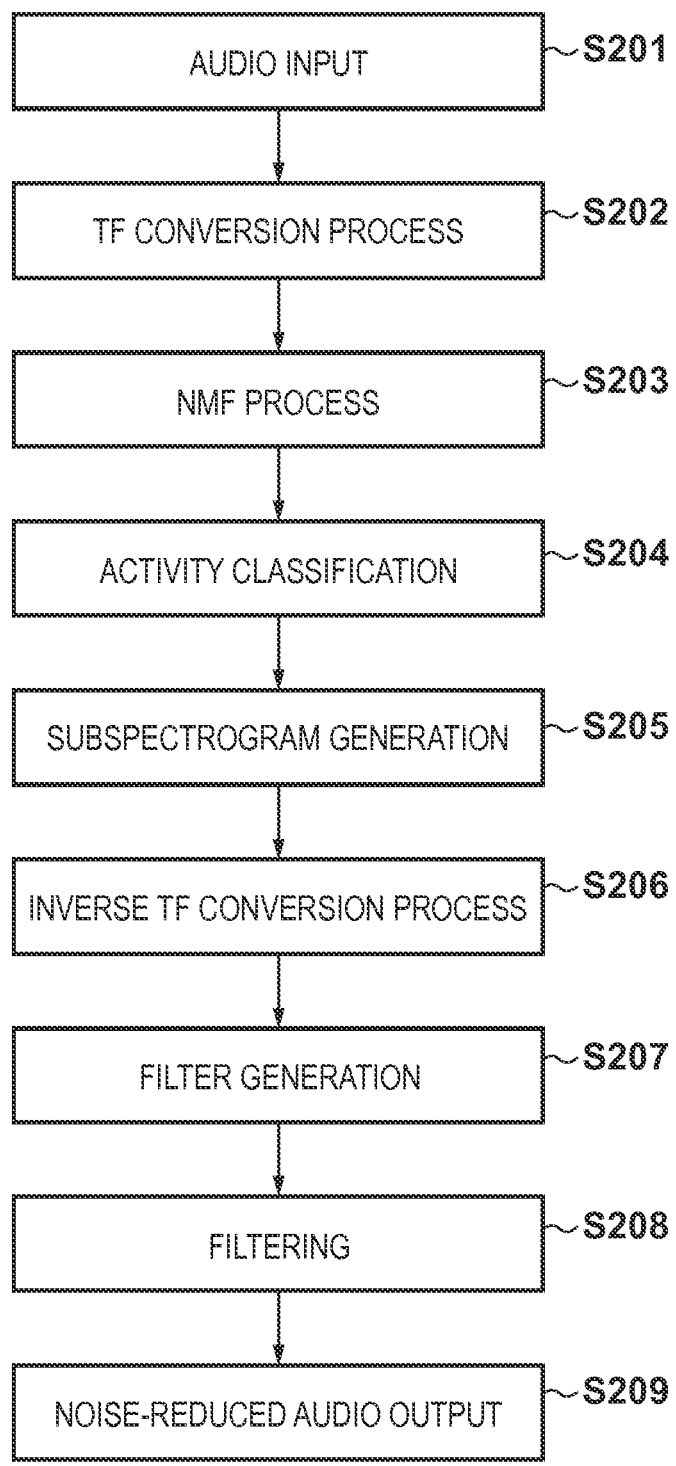
FIG. 9 is a flowchart showing the procedure of a noise reducing process.

The procedure of the signal processing (noise reducing process) executed by the noise reducer 200 in this embodiment will be explained with reference to FIG. 9. The noise reducing process is executed under the control of the CPU of the noise reducer 200.

Processing contents in steps S201 to S206 and S209 are the same as those in steps S101 to S107 (FIG. 5) of the above-described embodiment. That is, a mixed signal is first input to the input unit 110 (step S201). The TF converter 120 converts the input mixed signal into a spectrogram (step S202). Then, the NMF unit 130 performs an NMF process on the spectrogram input from the TF converter 120, and outputs a basis matrix and activity matrix (step S203). Subsequently, the activity classification unit 140 classifies each activity into a noise activity or sound activity in accordance with the frequency characteristic of the activity (step S204). Based on the activity classification results output from the activity classification unit 140, the subspectrogram generator 150 generates a noise spectrogram and sound spectrogram (step S205). The inverse TF converter 160 generates a sound waveform signal and noise waveform signal from the sound spectrogram and noise spectrogram output from the subspectrogram generator 150 (step S206).

Then, the filter generator 210 generates a Wiener filter for reducing noise (step S207). In this step, frequency conversion is performed on the separated sound signal and noise signal, and a Wiener filter for a frequency region is generated by the power spectra. The filter coefficient of the generated filter is output to the filter unit 220. Subsequently, the filter unit 220 performs a filtering process on the mixed signal input to the input unit 110 (step S208). In this step, the mixed signal is filtered by using the coefficient of the filter generated by the filter generator 210, and the filtered signal is output to the output unit 170. Finally, the output unit 170 plays back the sound signal (step S209).

As described above, it is possible to estimate a noise component and sound component in a mixed signal based on the frequency characteristic of the activity vector calculated by NMF of the mixed signal, and form a filter for preventing noise based on the estimation result. The noise component in the mixed signal can be prevented by applying the filter to the mixed signal.

(Modifications)

In this embodiment, the filter generator 210 generates a Wiener filter from the power spectra of the sound signal and noise output from the inverse TF converter 160. However, it is also possible to calculate a power spectrum for each time frame from the output from the subspectrogram generator 150, so a Wiener filter can also be generated for, for example, each time frame. In this case, a signal is first cut in the filter unit 220 by applying a window function while shifting a time zone for every predetermined time length as in the TF converter 120. Subsequently, a filtering process is performed by applying the generated Wiener filter to the cut signals, and the cut signals are superposed and combined while shifting the time zone for every predetermined time length. This arrangement can perform a more appropriate filtering process in accordance with the elapse of time.

Also, the filter generator 210 generates a Wiener filter, but may also generate another filter as long as the filter prevents noise. For example, the filter generator 210 may also generate a comb filter which emphasizes a separated sound signal by focusing on the sound signal.

Figure 10:
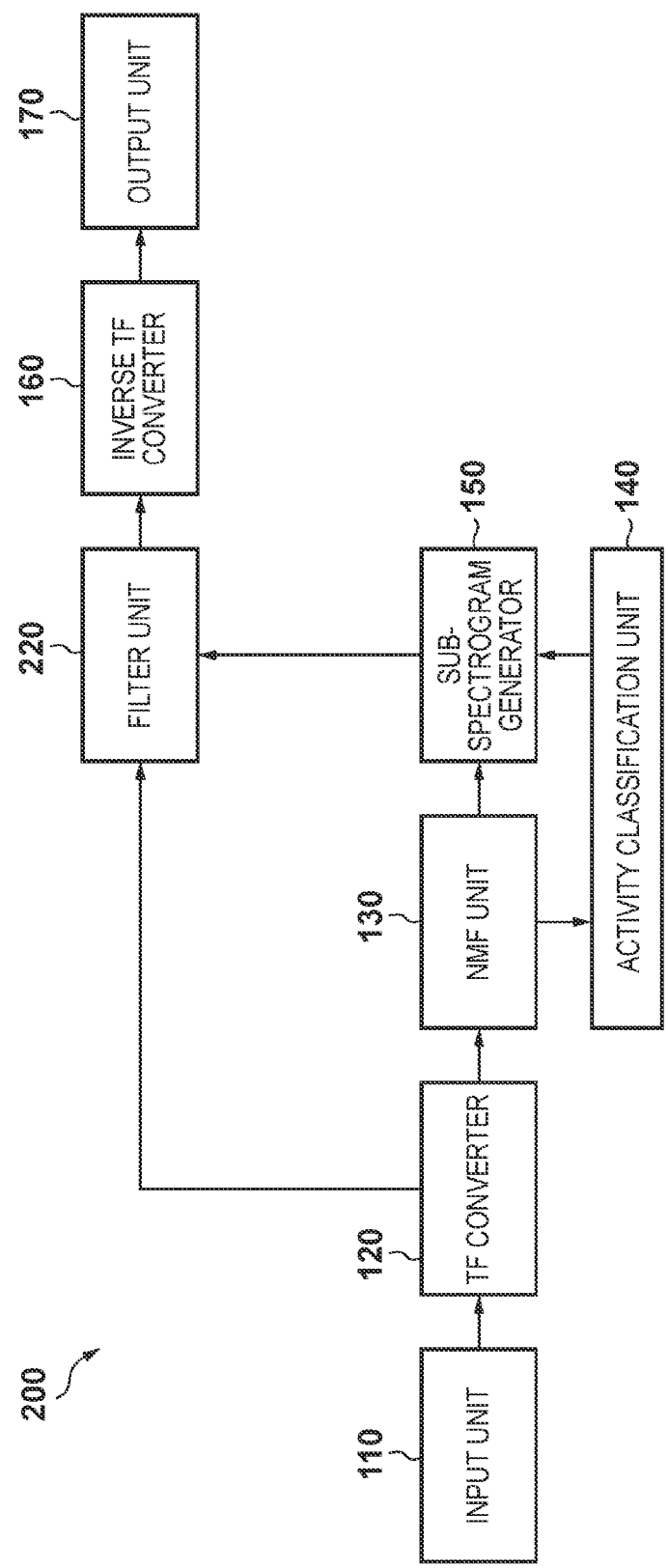
FIG. 10 is a block diagram showing another arrangement of the noise reducer.

In this embodiment, the filter unit 220 applies the filter output from the filter generator 210 to an input signal. However, noise reduction can also be performed by using spectral subtraction. For example, spectral subtraction can be performed on a mixed signal input to the input unit 110 by using the noise spectrogram of the subspectrogram generator 150. In this case, as shown in, for example, FIG. 10, the filter unit 220 subtracts the noise spectrogram output from the subspectrogram generator 150 from the mixed signal converted into a spectrogram by the TF converter 120. The spectrogram in which noise is reduced by the spectral subtraction process in the filter unit 220 is output to the inverse TF converter 160, and converted into a waveform signal. This arrangement can cancel a noise component.

(Arrangement of Noise Reducer)

Figure 13:
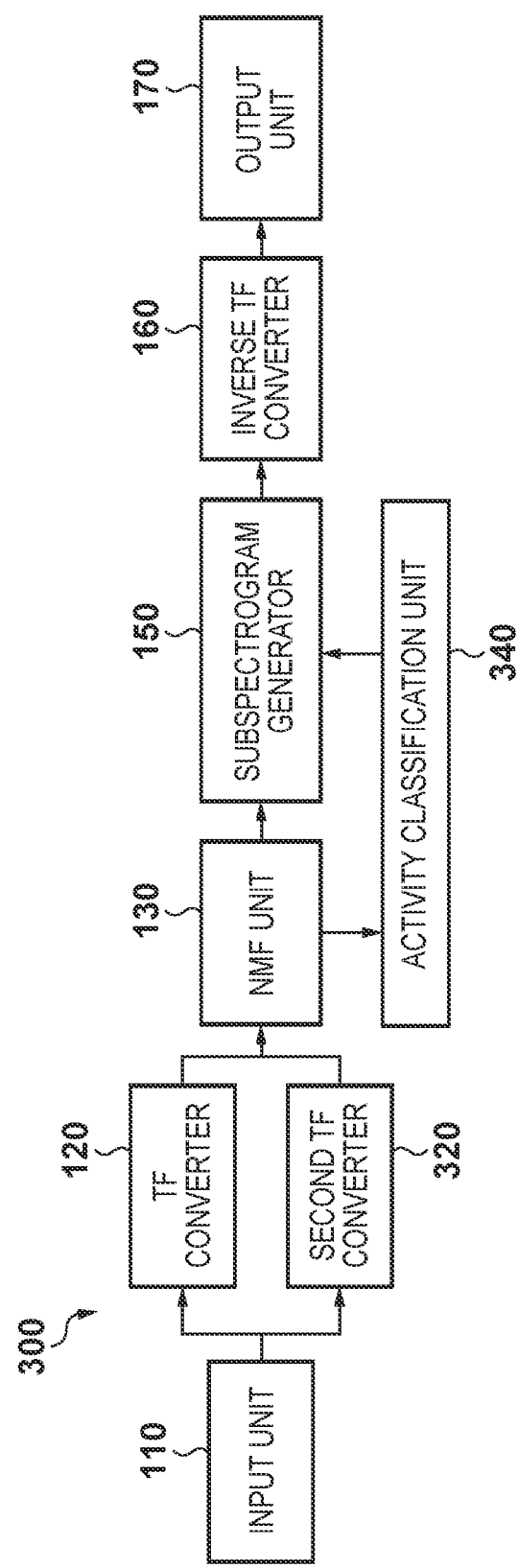
FIG. 13 is a block diagram showing the arrangement of a noise reducer.

FIG. 13 is a block diagram showing the arrangement of a noise reducer according to still another embodiment of the present invention. A noise reducer 300 of this embodiment includes an input unit 110, TF converter 120, NMF unit 130, subspectrogram generator 150, inverse TF converter 160, output unit 170, second TF converter 320, and activity classification unit 340. The input unit 110, TF converter 120, subspectrogram generator 150, inverse TF converter 160, and output unit 170 have the same arrangements as those of the above-described embodiments, so a detailed explanation thereof will be omitted. As in the above-described embodiments, the noise reducer 300 can be implemented by an information processing apparatus including a CPU, for example, a computer.

In this embodiment, a mixed signal input to the input unit 110 is output to the TF converter 120 and second TF converter 320 each of which performs time-frequency conversion. The second TF converter 320 performs time-frequency conversion at a cutting timing different from that of the TF converter 120. Let L be the length of a signal to be cut, and L/2 be the shift width of the cutting position. In this case, the TF converter 120 performs time-frequency conversion by cutting out the following section from a signal:

$$[mL/2,(m+2)L/2](m=0, 1, 2, \ldots) \qquad (13)$$

At this time, the second TF converter 320 performs time-frequency conversion by cutting out, for example, the following section from the signal:

$$[(2m+1)L/4,(2m+5)L/4](m=0, 1, 2, \ldots) \qquad (14)$$

To implement conversion like this, the second TF converter 320 may include, for example, a delay device having a sample number of L/4, and perform time-frequency conversion on a delayed signal. A calculated second spectrogram is output to the NMF unit 130.

Figure 14:
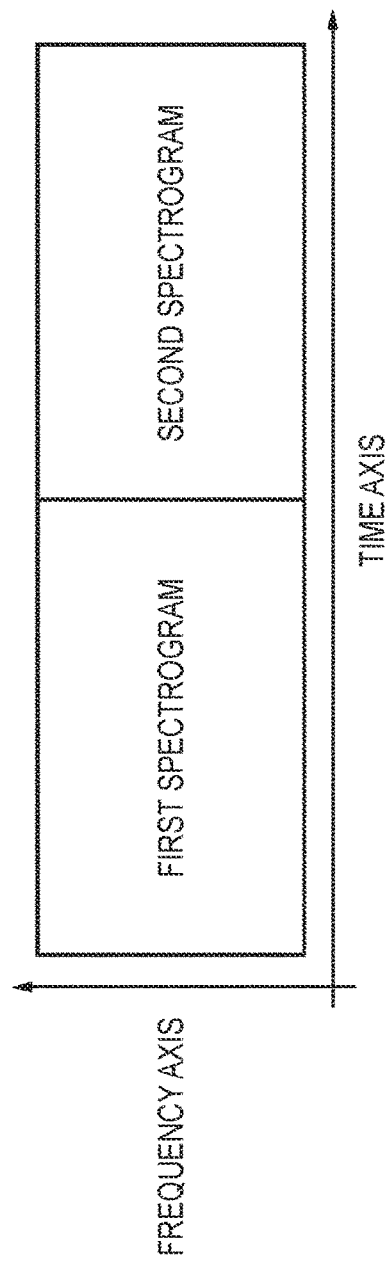
FIG. 14 is a view for explaining spectrogram connection.

The NMF unit 130 calculates activity matrices for the two input spectrograms by using the same basis matrix. An activity matrix calculation method will be explained with reference to FIG. 14. Assuming that the spectrogram output from the TF converter 120 is a first spectrogram, the first spectrogram and a second spectrogram are connected in the time-axis direction as shown in FIG. 14, and non-negative matrix factorization is performed. Consequently, activity matrices can be calculated for the first and second spectrograms by using a common basis matrix. When thus performing the calculations, the activity matrices for the first and second spectrograms are output as they are connected in the time-axis direction. Therefore, portions corresponding to the first and second spectrograms are output as first and second activity matrices to the subspectrogram generator 150 and activity classification unit 340.

The activity classification unit 340 classifies activities by comparing the input first and second activity matrices. For example, the activity classification unit 340 calculates the correlation coefficients of first and second activity vectors as the row components of the first and second activity matrices. Generally, sound activities have almost the same shape regardless of a waveform cutting position, whereas noise activities have different shapes due to a shift of the cutting position. Based on the calculation results, therefore, an activity having a correlation coefficient larger than a predetermined threshold can be classified as a sound activity, and an activity having a correlation coefficient smaller than the threshold can be classified as a noise activity. The activity classification unit 340 outputs the classification result of the first activity matrix to the subspectrogram generator 150. Processes in the subspectrogram generator 150, inverse TF converter 160, and output unit 170 are the same as those of the above-described embodiments.

(Noise Reducing Process)

Figure 15:
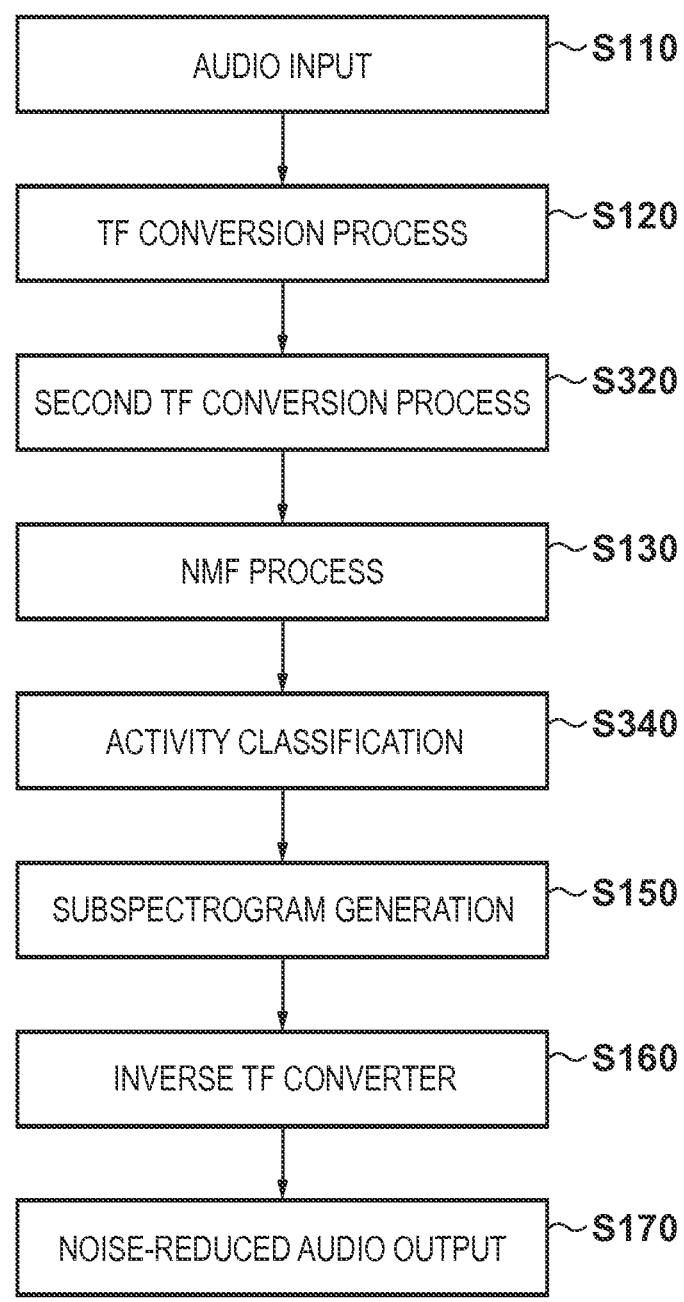
FIG. 15 is a flowchart showing the procedure of a noise reducing process.

The procedure of the noise reducing process executed by the noise reducer 300 in this embodiment will be explained with reference to FIG. 15. The noise reducing process is executed under the control of the CPU of the noise reducer 300.

Processing contents in steps S110, S120, S150, S160, and S170 are almost the same as those in steps S101, S102, and S105 to S107 (FIG. 5) of the above-described embodiments, so a detailed explanation thereof will be omitted. First, a mixed signal is input to the input unit 110 (step S110). The TF converter 120 converts the input mixed signal into a spectrogram (step S120).

Then, the second TF converter 320 performs a second TF conversion process (step S320). That is, the second TF converter 320 performs time-frequency conversion on the signal input from the input unit 110 while shifting the cutting position from that of the TF converter 120, and outputs the obtained spectrogram to the NMF unit 130.

Subsequently, the NMF unit 130 performs an NMF process (step S130). That is, the NMF unit 130 arranges the amplitude components of the spectrograms input from the TF converter 120 and second TF converter 320 in the time-axis direction, and performs non-negative matrix factorization, thereby calculating a common basis matrix and first and second activity matrices. The NMF unit 130 outputs the calculated first and second activity matrices to the activity classification unit 340. Also, the NMF unit 130 outputs the basis matrix, the phase component of the spectrogram input from the TF converter 120, and the first activity matrix to the subspectrogram generator 150.

The activity classification unit 340 performs activity classification (step S340). That is, the activity classification unit 340 calculates the correlation coefficients of activity vectors containing the components of the individual rows of the first and second activity matrices input from the NMF unit 130. Based on the calculated correlation coefficients, the activity classification unit 340 classifies an activity having a high correlation as a sound activity, and an activity having a low correlation as a noise activity, and outputs the results to the subspectrogram generator 150.

In this embodiment as described above, each activity vector is classified based on the correlation of the activity vector, which is calculated by NMF for two spectrograms generated at different timings. Accordingly, the arrangement of this embodiment can separate a mixed signal for each sound source even when using a single channel.

(Modifications)

In this embodiment, the NMF unit 130 calculates the first and second activity matrices having the common basis matrix by using the spectrograms connected in the time-axis direction. However, another method may also be used. For example, it is also possible to calculate a basis matrix by performing non-negative matrix factorization on the first spectrogram, and perform non-negative matrix factorization on the second spectrogram by using the basis matrix as an instruction basis, thereby calculating the first and second activity matrices having the common basis matrix.

Also, in this embodiment, the activity classification unit 340 outputs the classification results for the first activity matrix, in order to perform sound source separation or noise reduction on the output from the TF converter 120. However, it is also possible to perform sound source separation or noise reduction on the output from the second TF converter 320, or on both the outputs from the TF converter 120 and second TF converter 320. In this case, it is possible to output the classification results for the second activity matrix, or the classification results for both the first and second activity matrices.

The present invention can separate sound sources having different activity characteristics from an audio signal of a single channel, and reduce noise by using a separated noise component.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-237355, filed Nov. 15, 2013, and 2014-158122, filed Aug. 1, 2014 which are hereby incorporated by reference herein in their entirety.

What is claimed is:

1. An information processing apparatus comprising:
at least one processor functioning as:
an acquisition unit adapted to acquire a plurality of activity vectors corresponding to a plurality of basis vectors as a result of performing non-negative matrix factorization for an audio signal including audio and noise;
a determination unit adapted to determine for each of the plurality of acquired activity vectors whether the activity vector has a noise characteristic based on a waveform of the activity vector, wherein when the difference between a component of a first frequency band of a first activity vector and a component of a second frequency band of the first activity vector which is higher than the first frequency band is smaller than the difference between a component of the first frequency band of a second activity vector having an audio characteristic and a component of the second frequency band of the second activity vector, the first activity vector is determined to have the noise characteristic; and
an output unit adapted to output a signal obtained by separating, from the audio signal, a component corresponding to the activity vector which is determined to have the noise characteristic by said determination unit.

2. The apparatus according to claim 1, wherein said acquisition unit acquires the plurality of activity vectors corresponding to the plurality of basis vectors by decomposing a matrix obtained by converting an audio signal into a time-frequency representation, into at least a non-negative value basis matrix and a non-negative value activity matrix.

3. The apparatus according to claim 1, wherein said determination unit determines that an activity vector for which a difference between an average value of components in a first frequency band and an average value of components in a second frequency band higher than the first frequency band is smaller than a predetermined threshold in a frequency characteristic of the activity vector is an activity vector having a noise characteristic.

4. The apparatus according to claim 1, wherein if a slope of an approximate straight line of a frequency characteristic of the activity vector is smaller than a predetermined threshold, said determination unit determines that the activity vector has a noise characteristic.

5. The apparatus according to claim 1, wherein if the number of activities within a given time range is higher than a predetermined threshold, said determination unit determines that the activity vector has a noise characteristic.

6. The apparatus according to claim 1, wherein if an average value of peak time spans of the activity vector is smaller than a predetermined threshold, said determination unit determines that the activity vector has a noise characteristic.

7. The apparatus according to claim 1, wherein if a sum of absolute values of derivative values of the activity vector is larger than a predetermined threshold, said determination unit determines that the activity vector has a noise characteristic.

8. The apparatus according to claim 1, wherein said determination unit acquires a first sample vector and a second sample vector by extracting samples at a predetermined interval from the activity vector, and, if a correlation between the first sample vector and the second sample vector is smaller than a predetermined threshold, determines that the activity vector is an activity vector having a noise characteristic.

9. The apparatus according to claim 2, wherein said acquisition unit determines a characteristic of the activity vector by comparing the plurality of activity vectors.

10. The apparatus according to claim 1, wherein said output unit outputs the audio signal based on a first weighting factor indicating a degree of noise in activity, and a second weighting factor indicating a degree of sound in the activity, for each of the activity vectors.

11. An information processing method to be executed by each unit of an information processing apparatus, wherein at least one processor acts as each unit, the method comprising:
causing an acquisition unit to a plurality of activity vectors corresponding to a plurality of basis vectors as a result of performing non-negative matrix factorization for an audio signal including audio and noise;
causing a determination unit to determine for each of the plurality of acquired activity vectors the activity vector has a noise characteristic based on a waveform of activity vector, wherein when the difference between a component of a first frequency band of a first activity vector and a component of a second frequency band of the first activity vector which is higher than the first frequency band is smaller than the difference between a component of the first frequency band of a second activity vector having an audio characteristic and a component of the second frequency band of the second activity vector, the first activity vector is determined to have the noise characteristic; and
causing an output unit to output a signal obtained by separating, from the audio signal, a component corresponding to the activity vector which is determined to have the noise characteristic.

12. The method according to claim 11, wherein in the determination, it is determined that an activity vector for which a difference between an average value of components in a first frequency band and an average value of components in a second frequency band is smaller than a predetermined threshold in a frequency characteristic of the activity vector is an activity vector having a noise characteristic.

13. The method according to claim 11, wherein in the determination, if a slope of an approximate straight line of the frequency characteristic of the activity vector is smaller than a predetermined threshold, it is determined that the activity vector has a noise characteristic.

14. The method according to claim 11, wherein in the determination, if the number of activities within a given time range is higher than a predetermined threshold, it is determined that the activity vector has a noise characteristic.

15. The method according to claim 11, wherein in the determination, if an average value of peak time spans of the activity vector is smaller than a predetermined threshold, it is determined that the activity vector has a noise characteristic.

16. The method according to claim 11, wherein in the determination, if a sum of absolute values of derivative values of the activity vector is larger than a predetermined threshold, it is determined that the activity vector has a noise characteristic.

17. The method according to claim 11, wherein in the determination, a first sample vector and a second sample vector are acquired by extracting samples at a predetermined interval from the activity vector, and, if a correlation between the first sample vector and the second sample vector is smaller than a predetermined threshold, it is determined that the activity vector is an activity vector having a noise characteristic.

18. The method according to claim 11,
wherein in the acquisition step, the plurality of activity vectors corresponding to the plurality of basis vectors are acquired by decomposing a matrix obtained by converting an audio signal into a time-frequency representation, into at least a non-negative value basis matrix and a non-negative value activity matrix, and
wherein in the acquisition step, a characteristic of the activity is determined by comparing the plurality of activity vectors.

19. A non-transitory computer-readable storage medium storing a computer program for causing a computer to function as each unit of an information processing apparatus comprising:
an acquisition unit adapted to acquire a plurality of activity vectors corresponding to a plurality of basis vectors as a result of performing non-negative matrix factorization for an audio signal including audio and noise;
a determination unit adapted to determine for each of the plurality of acquired activity vectors whether the activity vector has a noise characteristic based on a waveform of the activity vector, wherein when the difference between a component of a first frequency band of a first activity vector and a component of a second frequency band of the first activity vector which is higher than the first frequency band is smaller than the difference between a component of the first frequency band of a second activity vector having an audio characteristic and a component of the second frequency band of the second activity vector, the first activity vector is determined to have the noise characteristic; and
an output unit adapted to output a signal obtained by separating, from the audio signal, a component corresponding to the activity vector which is determined to have the noise characteristic by said determination unit.

* * * * *